(12) United States Patent
Takatori et al.

(10) Patent No.: US 6,421,027 B1
(45) Date of Patent: Jul. 16, 2002

(54) MILLIMETER-WAVE SIGNAL TRANSMISSION SYSTEM COMMUNICATABLE WITHIN BUILDINGS

(75) Inventors: Sunao Takatori; Hisanori Kiyomatsu, both of Tokyo (JP)

(73) Assignee: Yozan Inc., Tokyo (JP)

( * ) Notice: Subject to any disclaimer, the term of this patent is extended or adjusted under 35 U.S.C. 154(b) by 0 days.

(21) Appl. No.: 09/876,404

(22) Filed: Jun. 7, 2001

(30) Foreign Application Priority Data

Nov. 30, 2000 (JP) .................................... 2000-364328

(51) Int. Cl.[7] .............................................. H01Q 21/00
(52) U.S. Cl. ...................... 343/893; 343/853; 455/11.1
(58) Field of Search ................................ 343/853, 890, 343/893; 455/68, 69, 11.1, 15, 127, 562

(56) References Cited

U.S. PATENT DOCUMENTS

| | | | | |
|---|---|---|---|---|
| 5,794,151 A | * | 8/1998 | McDonald et al. ........... 454/63 |
| 5,963,846 A | * | 10/1999 | Kurby ........................ 455/12.1 |
| 6,160,514 A | * | 12/2000 | Judd .................... 343/700 MS |
| 6,163,299 A | * | 12/2000 | Park .................... 343/700 MS |

* cited by examiner

Primary Examiner—Tan Ho
(74) Attorney, Agent, or Firm—Reed Smith LLP (57) ABSTRACT

Within a building, wireless communications can be carried out by using signals at millimeter wavelengths. The building is, for instance, arranged by employing: a first antenna mounted on the side of one surface of a door or a wall, for sensing a signal having a millimeter wavelength; a second antenna mounted on the side of the other surface of the door or the wall, for radiating a signal having a millimeter wavelength; a first receiver for receiving the millimeter-wave signal sensed by the first antenna, and for converting the received millimeter-wave signal into an electric signal; and a first transmitter for converting the electric signal which is received and converted by the first receiver into the millimeter-wave signal and for transmitting the converted millimeter-wave signal via the second antenna.

11 Claims, 8 Drawing Sheets

MILLIMETER-WAVE SIGNAL TRANSMISSION SYSTEM COMMUNICATABLE WITHIN BUILDINGS

CROSS-REFERENCE TO RELATED APPLICATIONS

This application claims priority of Japanese Application No. 2000-364328, filed Nov. 30, 2000, the complete disclosure of which is hereby incorporated by reference.

BACKGROUND OF THE INVENTION a) Field of the Invention

The present invention relates to a building, a door, a doorknob, a handrail, and a signal transmission method, capable of transmitting a millimeter-wave signal from a transmission station to a reception station within a building.

b) Description of the Related Art

Since personal computers and multi-function type telephones have become popular, there are strong demands for a plurality of electronic appliances having communication functions are desired to be set within homes. Further, a so-called "home-use automation system" has been proposed. For instance, a user may issue an instruction to operate an air conditioner installed in his/her home via a telephone line while this user is outside his/her home. Also, a user may control an image recording apparatus from the outside of his/her home so as to record a desirable television program by this image recording apparatus.

In such a home-use automation system, it may be so supposed that users issue instructions via a telephone line or the like to the respective home electric appliances. In this case, telephone lines and the like need to be connected to the home electric appliances.

Under such circumstances, the following technical solution may be conceived; while a user does not directly send the instructions to the respective home electric appliances, wireless communication may be carried out among the respective home electric appliances in such a manner that an instruction issued by the user is received by a predetermined terminal apparatus, and then, this instruction is transferred from this terminal apparatus to one or more other home electric appliances.

In this case, when these home electric appliances are connected to each other through signal cables, the signal cables are installed within a house, which may deteriorate interior appearances. Therefore, the communication system may be preferably used by utilizing the existing home-use electric power lines, or by utilizing wireless communication systems.

In a communication system using the existing home-use electric power lines, for instance, a mother telephone set and daughter telephone sets are communicable with each other via the existing home-use electric power lines.

On the other hand, as to wireless data communication available among home electric appliances, various standards such as Bluetooth have been proposed. In the Bluetooth standard, wireless communication in frequency of 2.45 GHz is used, and data communication is realized in the transfer speed of approximately 1 Mbps (bit per second) by wireless among home electric appliances such as personal computers and personal digital assistances (PDAs).

Another sort of wireless data communication is known in this technical field, e.g., a wireless LAN (Local Area Network) system such as the one defined in IEEE 802.11 which provides data communication speed of 11 Mbps in the frequency range of 2.4 GHz.

In the case where the above-explained wireless communication systems are utilized, generally speaking, a wireless data reaching distance is shortened under an indoor environment due to a few or more obstacles such as walls in some arrangements, compared with that under an outdoor environment.

In the case where the wireless data communication is carried out in the above-explained frequency range, the electromagnetic waves can pass through only small number of obstacles, so that data communication may be established. However, in a future case where wireless communication in the frequency range of millimeter wavelengths may be realized so as to further increase the transfer speed of the wireless communication, signals at such millimeter wavelengths can hardly pass through obstacles, due to the straight propagation characteristic and the reflection characteristic of these millimeter-wave signals. As a consequence, the following difficulties may occur; the wireless communication can hardly be established over doors and walls at the ordinary intensity level of electromagnetic waves of millimeter wavelengths.

Further, when such wireless communication will be realized between floors by wireless signals at millimeter wavelengths, a ceiling and the like may act as an obstacle. As a result, it is practically difficult that the wireless communication between floors may be carried out by the wireless signals at millimeter wavelengths.

OBJECT AND SUMMARY OF THE INVENTION

Accordingly, the present invention has an object to provide a building, a door, a doorknob, a handrail, and a transmission method, capable of executing wireless communication with millimeter-wave signals under an indoor environment.

To achieve the above-explained object, a building according to an aspect of the present invention, is characterized by comprising: a first antenna mounted on the side of one surface of a door or a wall, for sensing a signal at a millimeter wavelength; a second antenna mounted on the side of the other surface of the door or the wall, for radiating a signal at a millimeter wavelength; a first receiver for receiving the millimeter-wave signal sensed via the first antenna, and for converting the sensed millimeter-wave signal into an electric signal; and a first transmitter for converting the electric signal which is received and converted by the first receiver into the millimeter-wave signal and for transmitting the converted millimeter-wave signal via the second antenna.

As a result, even when obstacles such as a door and a wall are present on a signal transmission path, wireless communication can be carried out by using signals at millimeter wavelengths within a building.

Furthermore, a building according to another aspect of the present invention, in the above-mentioned aspect of the present invention, is characterized by further comprising: a first transfer unit including a third antenna for sensing a signal at a millimeter wavelength, and a second receiver for receiving the millimeter-wave signal sensed by the third antenna to convert the received millimeter-wave signal into an electric signal and for transmitting the converted electric signal via a home-use electric power line, the first transfer unit being installed around a wall outlet of a home-use power supply on a predetermined floor of a home; and a second transfer unit including a fourth antenna for radiating a signal at a millimeter wavelength, and a second transmitter for receiving the electric signal which is transmitted via the home-use electric power line to convert the received electric signal into the millimeter-wave signal and for transmitting the converted millimeter-wave signal via the fourth antenna, the second transfer unit being installed around a wall outlet of the home-use power supply on a floor different from the predetermined floor.

As a result, even in a case where the transmission path extends over floors, wireless communication can be carried out by employing the signals having millimeter wavelengths within the building, while the existing home-use electric power line is utilized. Accordingly, high-speed and low-cost information communication can be realized with large capacity by wireless.

Further, in a building according to another aspect of the present invention, besides the above-mentioned aspect of the present invention, both the first receiver and the first transmitter operate only when the door is closed.

As a result, electric power consumed by both the first receiver and the first transmitter can be suppressed. It should be noted that when the door is opened, since millimeter-wave signals may directly pass through a doorway, even if operations of both the first receiver and the first transmitter are stopped, there is no problem in the transmission of millimeter-wave signals.

Moreover, a building according to a further aspect of the present invention, is characterized by comprising: a first antenna provided on one end portion of a handrail which is mounted along stairs or a corridor, for sensing a signal at a millimeter wavelength; a second antenna provided on the other end portion of the handrail, for radiating a signal at a millimeter wavelength; a receiver for receiving the millimeter-wave signal which is sensed by the first antenna and for converting the received millimeter-wave signal into an electric signal; and a transmitter for converting the electric signal which is converted by the receiver into a millimeter-wave signal, and for transmitting the converted millimeter-wave signal via the second antenna.

As a consequence, even in such cases where obstacle such as the stairs is present on the transmission path and that millimeter-wave signals can be hardly transmitted through a narrow corridor, wireless communication can be carried out by using millimeter-wave signals inside the building. Further, since handrails are often required for going up and down the stairs, the users do not have a sense of incongruity when such handrails equipped with the transmitter/receiver are installed. In addition, since one or more handrails are often utilized unless information communication is needed, there is almost no increase in the cost of equipment when information communication are carried out using the present handrail.

Further, a door according to an aspect of the present invention is characterized by comprising: a first antenna mounted on any one of one knob portion of a doorknob, a fixing portion for fixing the doorknob on one surface of the door, and one surface of the door, for sensing a signal at a millimeter wavelength; a second antenna mounted on any one of the other knob portion of the doorknob, another fixing portion for fixing the doorknob on the other surface of the door, and the other surface of the door, for radiating a signal at a millimeter wavelength; a receiver for receiving the millimeter-wave signal which is sensed by the first antenna and for converting the received millimeter-wave signal into an electric signal; and a transmitter for converting the electric signal which is converted by the receiver into the millimeter-wave signal and for transmitting the converted millimeter-wave signal via the second antenna.

As a consequence, even in a case where the door as an obstacle is present on the transmission path, wireless communication can be carried out by using millimeter-wave signals inside the building. Further, since a door can be individually replaced with the door already fixed as a fixture, the door according to the present invention can be applied even to such a building which has already been constructed. Thus, wireless communication with millimeter-wave signals may be realized in general houses by replacing the existing door with the door of the present invention.

Furthermore, a door according to another aspect of the present invention, in the above-mentioned aspect of the present invention, is characterized in that both the receiver and the transmitter operate only when the door is closed.

As a result, electric power consumed by both the receiver and the transmitter can be suppressed. It should be noted that when the door is opened, since millimeter-wave signals may directly pass through a doorway, even if operations of both the receiver and the transmitter are stopped, there is no problem in the transmission of millimeter-wave signals.

A doorknob according to an aspect of the present invention is characterized by comprising: a first antenna mounted on one knob portion, for sensing a signal at a millimeter wavelength; a second antenna mounted on the other knob portion, for radiating a signal at a millimeter wavelength; a receiver for receiving the millimeter-wave signal which is sensed by the first antenna and for converting the received millimeter-wave signal into an electric signal; and a transmitter for converting the electric signal which is converted by the receiver into the millimeter-wave signal and for transmitting the converted millimeter-wave signal via the second antenna.

As a consequence, even in a case where the door as an obstacle is present on the transmission path, wireless communication can be carried out by using millimeter-wave signals inside the building. Further, since a doorknob can be individually replaced by another doorknob as a fixture, the doorknob according to the present invention can be applied even to such a building which has already been constructed. Thus, wireless communication with millimeter-wave signals may be realized in general houses by replacing the existing doorknob with the doorknob of the present invention at little expense.

Moreover, a doorknob according to another aspect of the present invention is characterized in that both the receiver and the transmitter operate only when the door having the doorknob is closed.

As a result, electric power consumed by both the receiver and the transmitter can be suppressed. It should be noted that when the door is opened, since millimeter-wave signals may directly pass through a doorway, even if operations of both the receiver and the transmitter are stopped, there is no problem in the transmission of millimeter-wave signals.

In addition, a handrail according to an aspect of the present invention is characterized by comprising: a first antenna mounted on one end portion of the handrail, for sensing a signal at a millimeter wavelength; a second antenna mounted on the other end portion of the handrail, for radiating a signal at a millimeter wavelength; a receiver for receiving the millimeter-wave signal which is sensed by the first antenna and for converting the received millimeter-wave signal into an electric signal; and a transmitter for converting the electric signal which is converted by the receiver into the millimeter-wave signal and for transmitting the converted millimeter-wave signal via the second antenna.

As a result, even in cases where transmissions of the millimeter-wave signals directly to another floor are hardly achieved due to a ceiling as a shield, and that millimeter-wave signals can be hardly propagated through a narrow corridor, this handrail of the present invention is installed, so that wireless communication can be carried out by using millimeter-wave signals through such stairs and/or corridor within the building. Further, since handrail is often utilized unless information communication is needed, there is almost no increase in the cost of equipment when information communication is performed with the above-mentioned handrail.

Further, a transmission method according to an aspect of the present invention, is characterized by comprising the steps of: sensing a signal at a millimeter wavelength by a first antenna on the side of one surface of a door or a wall, which is present on a transmission path defined from a transmission station to a reception station; receiving the sensed millimeter-wave signal; converting the received millimeter-wave signal into an electric signal; and transmitting the electric signal via a second antenna as the millimeter-wave signal on the side of the other surface of the door or the wall.

As a result, even when obstacles such as the door and the wall are located in the transmission path, wireless communication can be carried out by employing millimeter-wave signals inside the building.

Furthermore, a transmission method according to another aspect of the present invention is characterized by comprising the steps of: sensing a signal at a millimeter wavelength by a first antenna on the side of one end portion of a handrail mounted along stairs or a corridor which is present on a transmission path defined from a transmission station to a reception station; receiving the sensed millimeter-wave signal; converting the received millimeter-wave signal into an electric signal; and transmitting the electric signal via a second antenna as the millimeter-wave signal on the side of the other end portion of the handrail.

As a result, even in cases where transmissions of millimeter-wave signals directly to another floor are hardly achieved due to a ceiling as a shield, and that millimeter-wave signals can be hardly propagated through a narrow corridor, this handrail of the present invention is installed, so that wireless communication can be carried out by using millimeter-wave signals through stairs and/or the corridor within the building. Further, since handrail is utilized unless information communication is needed, there is almost no increase in the cost of equipment when information communication is performed with the above-mentioned handrail.

BRIEF DESCRIPTION OF THE DRAWINGS

For a better understanding of the present invention, reference is made of a detailed description to be read in conjunction with the accompanying drawings, in which.

DETAILED DESCRIPTION OF THE PREFERRED EMBODIMENTS

Figure 1:
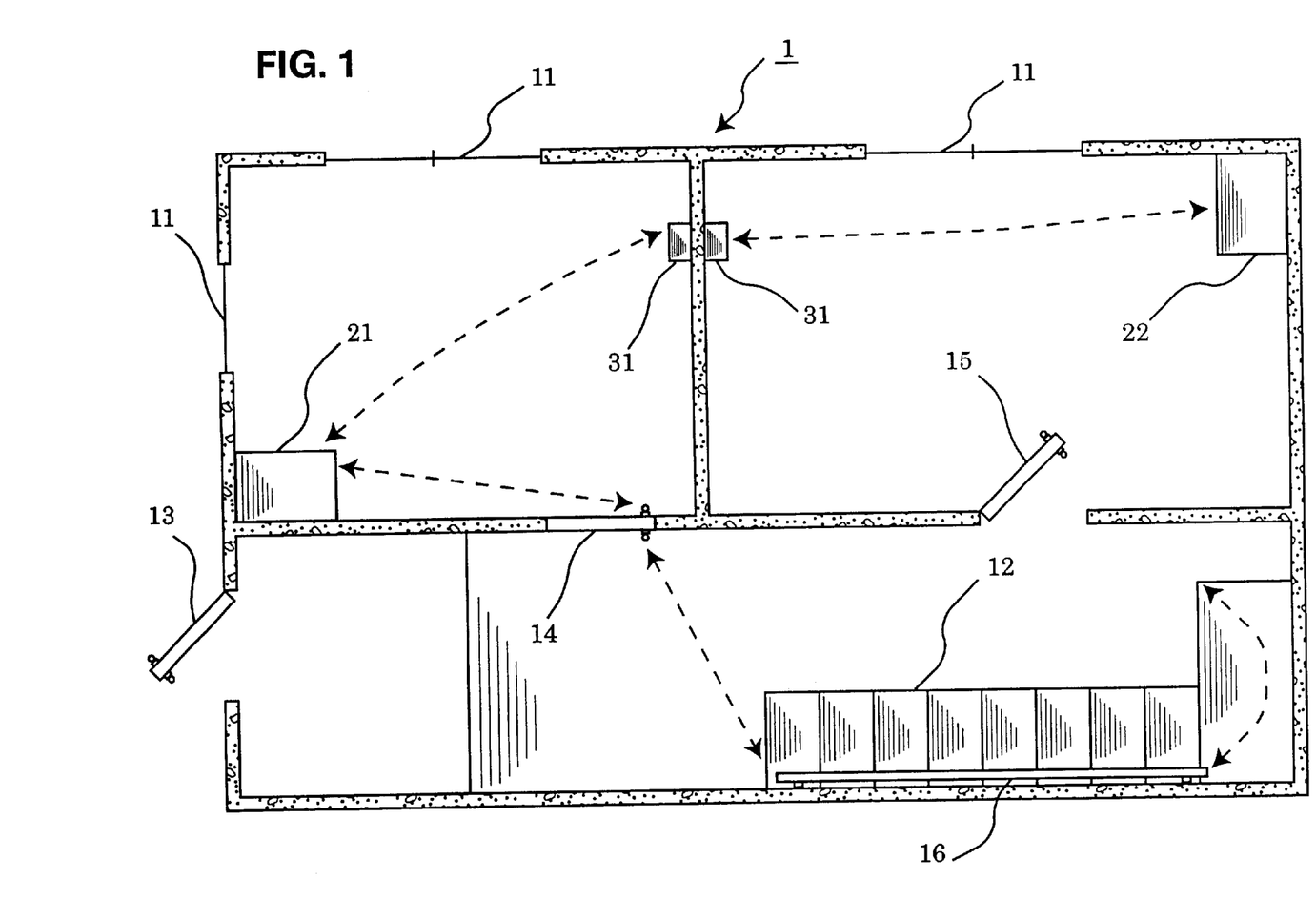
FIG. 1 is a sectional view indicating a first-floor portion of a building according to an embodiment of the present invention.
Figure 2:
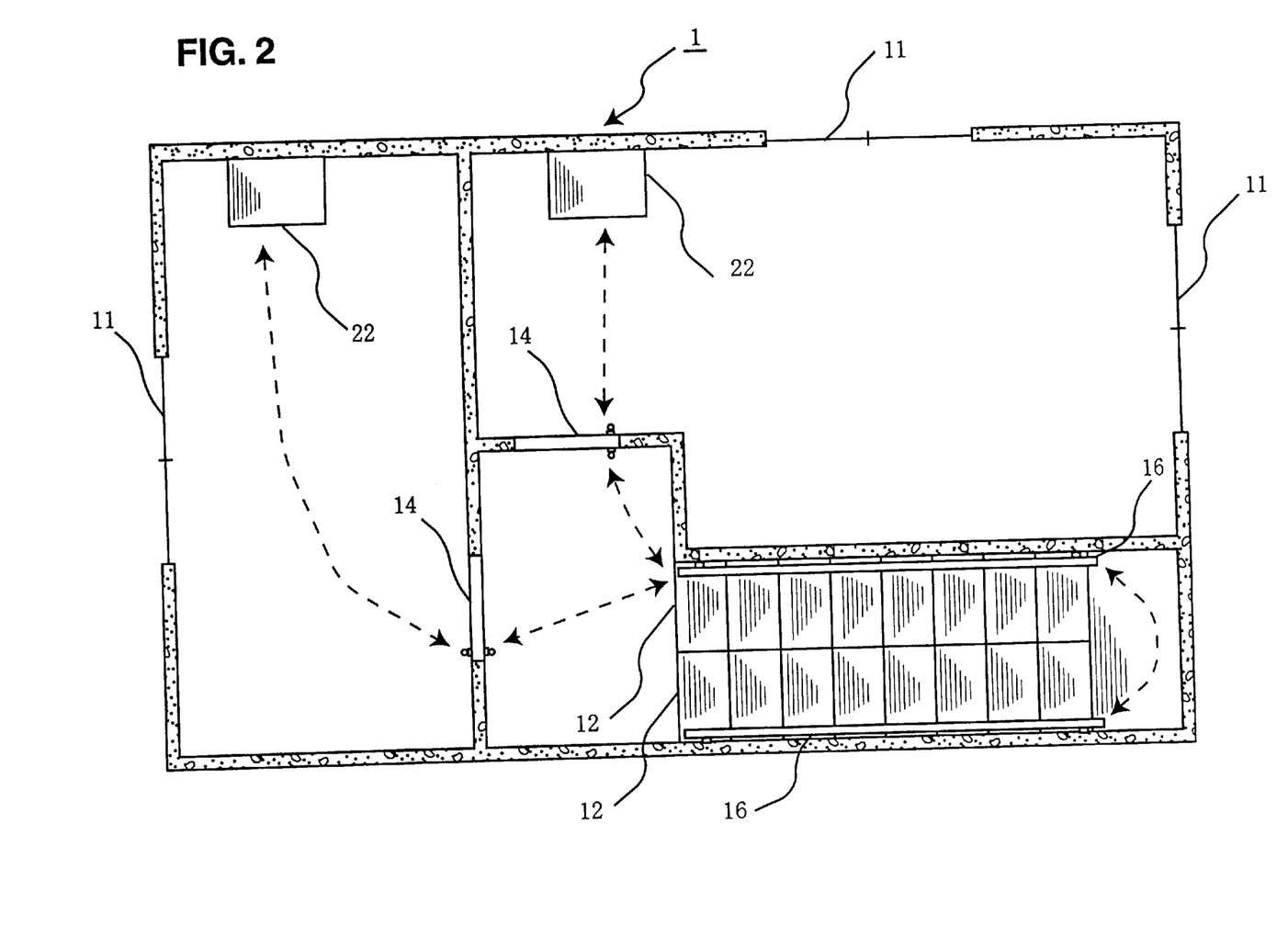
FIG. 2 is a sectional view representing a second-floor portion of the building according to the embodiment of the present invention.

Referring now to drawings, various embodiments of the present invention will be described.
Building Structure FIG. 1 is a sectional view indicating a first-floor portion of a building according to an embodiment of the present invention. FIG. 2 is a sectional view representing a second-floor portion of the building according to the embodiment of the present invention. In FIG. 1 or FIG. 2, a building 1 is such a building as an office and a house, in which wireless communication can be carried out by way of signals at millimeter wavelengths (namely, frequency range of 30 to 500 GHz corresponding to wavelengths of 10 millimeters to 0.6 millimeters). A window 11 is provided at either the first floor or the second floor of this building 1. Stairs 12 correspond to stairs provided between the first floor and the second floor of the building 1. A door 13 corresponds to a door of an entrance.

A door 14 corresponds to a door according to this embodiment of the present invention, or a door having a doorknob according to another embodiment of the present invention, which is pivotally installed within the building 1. Another door 15 corresponds to a normal door which is pivotally installed within the building 1. A handrail 16 corresponds to a handrail according to an embodiment of the present invention, which is installed along the stairs.

Moreover, a terminal apparatus 21 contains a computer, and is indirectly communicated with another terminal apparatus 22 via the door 14, the handrail 16, and a transmitter/receiver 31. The computer is equipped with a communication means such as a modem capable of communicating with an external electronic apparatus.

Furthermore, the terminal apparatus 22 contains home electric appliances such as an image recording apparatus or an air conditioner, and is indirectly communicated with the terminal apparatus 21 via the door 14, the handrail 16, and/or the transmitter/receiver 31. In other words, both the terminal apparatus 21 and the terminal apparatus 22 may function as a transmission station and a reception station, respectively.

Figure 3:
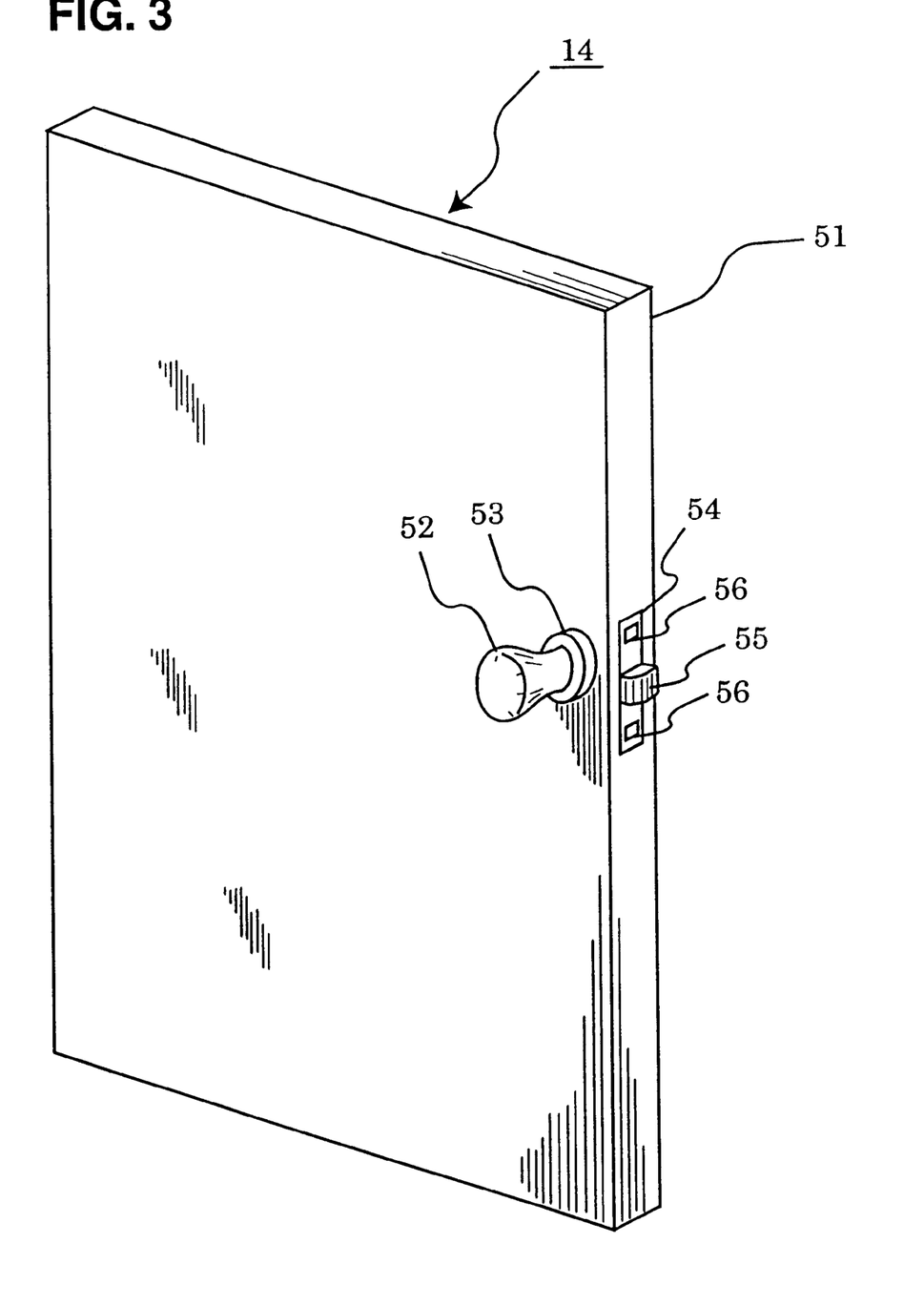
FIG. 3 is a perspective view representing an outer appearance of a door according to an embodiment of the present invention.
Figure 4:
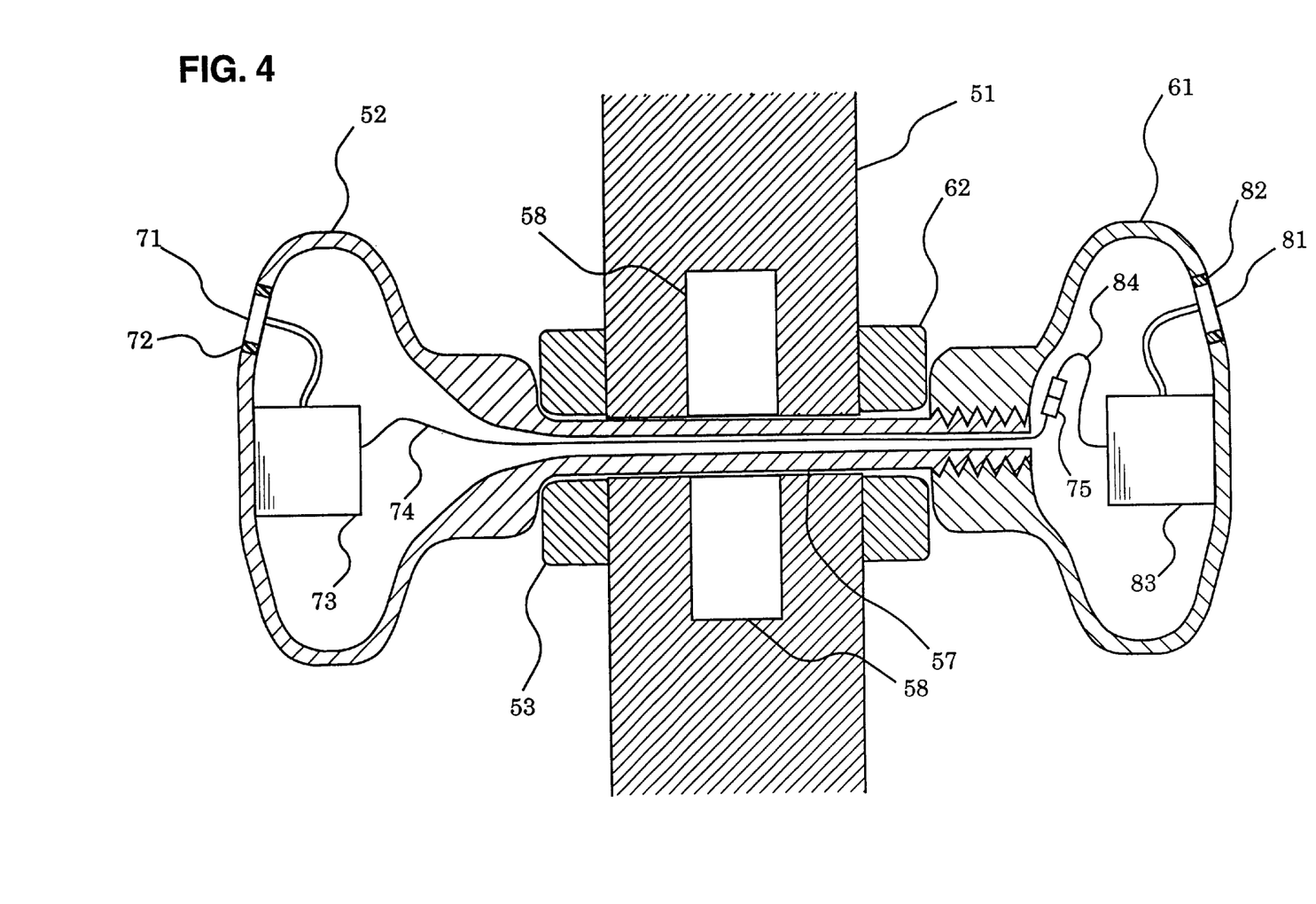
FIG. 4 is a sectional view showing a doorknob of the door indicated in FIG. 3.

In addition, the transmitter/receiver 31 is equipped through a wall in order to receive millimeter-wave signal on a surface of the wall and transmit the signal from the other surface of the wall.
Door Structure FIG. 3 is a perspective view indicating an outer appearance of the door 14 according to the embodiment of the present invention. FIG. 4 is a sectional view representing a doorknob of the door 14 shown in FIG. 3. In FIG. 3, a main body 51 of the door 14 is manufactured by employing, for example, timber, a metal, or the like. A knob portion 52 is coupled to another knob portion 61 (see FIG. 4) located opposite to the knob portion 52 by using a shaft 57 (see FIG.

4). When one of these knob portions 52 and 61 is pivotally moved, the other knob portion may be pivotally moved in conjunction with the above-mentioned knob portion. A fixed portion 53 corresponds to such a member used to fix the doorknob on the main body 51 of the door 14. An engaged portion 54 owns such a mechanism that a convex portion 55 is engaged with a concave portion (not shown) which is provided at a portion where, when the door 14 is closed, the engaged portion 54 is made in contact with this portion. Power supply terminals 56 may receive electric power from contact terminals (not shown). The contact terminals are provided on an opposite portion of the power supply terminal 56 in a fixture which is made in contact with the door when the door is closed.

In FIG. 4, the knob portion 52 has an antenna 71 used for a millimeter-wave signal on a surface thereof, and also has a transmission/reception module 73 and a cable 74 inside. An electric insulating portion 72 is arranged at a circumferential portion of the antenna 71. In addition, the knob portion 52 has the transmission/reception module 73 connected to this millimeter-wave antenna 71, and the cable 74. Similar to the knob portion 52, another knob portion 61 has an antenna 81 used for a millimeter-wave signal on a surface thereof, and also has a transmission/reception module 83 and a cable 84 inside. An electric insulating portion 82 is arranged at a circumferential portion of the antenna 81. In addition, the knob portion 61 has the transmission/reception module 83 connected to this millimeter-wave antenna 81, and the cable 84. It should be noted that both the antenna 71 and the antenna 81 may function as a first antenna sensing millimeter-wave signals and a second antenna radiating millimeter-wave signals.

Further, the shaft 57 is fixed in such a manner that a male screw is formed on a tip portion thereof and screwed with the knob portion 61. Moreover, the cable 74 is arranged in a hollow portion of the shaft 57. It should be understood that the cable 74 is previously coupled to the cable 84 by employing a connector 75 before the shaft 57 is screwed with the knob portion 61.

Furthermore, a hole 58 corresponds to such a hole which is formed so as to embed the engage portion 54 into the main body 51 of the door 14.

In addition, the antenna 71 is installed on the knob portion 52. This antenna 71 may electromagnetically sense a millimeter-wave signal and also may radiate a millimeter-wave signal on the side of one surface of the door 14. The insulating portion 72 may electrically insulate the antenna 71 from the main body of the doorknob.

As will be discussed later, furthermore, the transmission/reception module 73 receives millimeter-wave signal which has been sensed by the antenna 71, and then, converts this received millimeter-wave signal into an electric signal. After amplifying this converted electric signal, this transmission/reception module 73 supplies the amplified electric signal via the cables 74 and 84 to the transmission/reception module 83, and also transmits another electric signal supplied via the cables 74 and 84 from the transmission/reception module 83 as a millimeter-wave signal through the antenna 71.

Further, both the cable 74 and the cable 84 are used to transfer electric signals between the transmission/reception module 73 and the transmission/reception module 83. The connector 75 is employed so as to connect the cable 74 to the cable 84.

In addition, the antenna 81 is installed on the knob portion 61. This antenna 81 may electromagnetically sense a millimeter-wave signal and also may radiate a millimeter-wave signal on the side of the other surface of the door 14. The insulating portion 82 may electrically insulate the antenna 81 from the main body of the doorknob.

As will be discussed later, furthermore, the transmission/reception module 83 receives millimeter-wave signal which has been sensed by the antenna 81, and then, converts this received millimeter-wave signal into an electric signal. After amplifying this converted electric signal, this transmission/reception module 83 supplies the amplified electric signal via the cables 74 and 84 to the transmission/reception module 73, and also transmits another electric signal supplied via the cables 74 and 84 from the transmission/reception module 73 as a millimeter-wave signal through the antenna 81.

Handrail Structure

Figure 5:
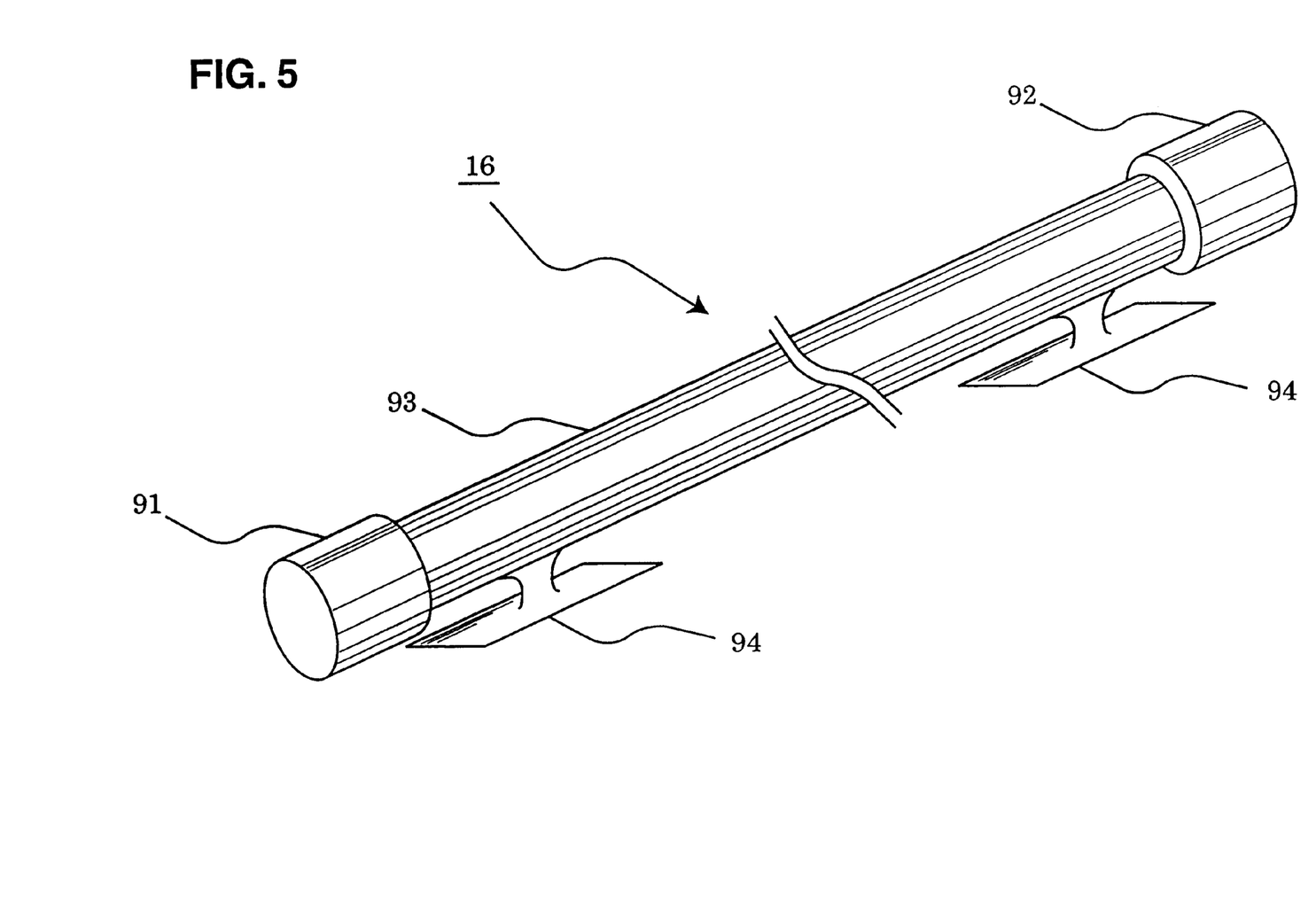
FIG. 5 is a perspective view showing an outer appearance of a handrail according to an embodiment of the present invention.
Figure 6:
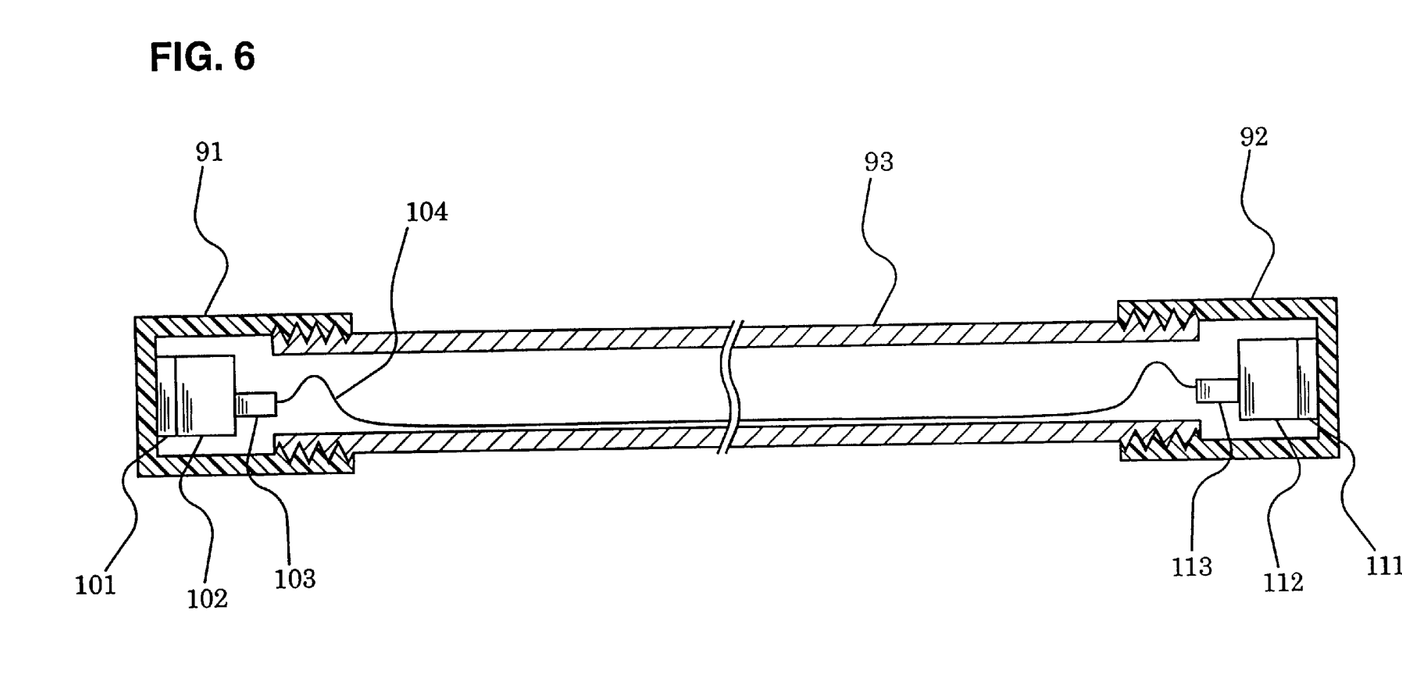
FIG. 6 is a sectional view showing the handrail in FIG. 5.

FIG. 5 is a perspective view showing an outer appearance of the handrail 16 according to the embodiment of the present invention. FIG. 6 is a sectional view indicating the handrail 16 shown in FIG. 5. In FIG. 5 or FIG. 6, a cap 91 is such a cap containing therein an antenna 101 used for signals at millimeter wavelengths, and a transmission/reception module 102. This cap 91 is made of a plastic material, and is screwed to one end of the handrail 16.

Further, another cap 92 is such a cap containing therein an antenna 111 used for signals at millimeter wavelengths, and a transmission/reception module 112. This cap 92 is made of a plastic material, and is screwed to the other end of the handrail 16. It should also be noted that both the antenna 101 and the antenna 111 may function as a first antenna capable of receiving a millimeter-wave signal, and also a second antenna capable of radiating a millimeter-wave signal.

It should also be understood that when both the antennas 101 and 111 are installed inside the caps 91 and 92, as the materials of these caps 91 and 92, various materials through which millimeter-wave signals can easily pass may be selected other than the above-explained plastic material.

Further, a tube 93 corresponds to such a tube which constitutes a main body portion of the handrail 16. A foot 94 is used to fix the handrail 16 on a wall along stairs.

Moreover, the antenna 101 is provided in the cap 91, and senses a millimeter-wave signal and further transmits a millimeter-wave signal at one end portion of the handrail 16. As will be discussed later, furthermore, the transmission/reception module 102 receives millimeter-wave signal sensed by the antenna 101, and then, converts this received millimeter-wave signal into an electric signal. After amplifying this converted electric signal, the transmission/reception module 102 supplies the amplified electric signal via a cable 104 to the transmission/reception module 1 12, and also transmits another electric signal supplied via the cable 104 from the transmission/reception module 112 as a millimeter-wave signal through the antenna 101.

Furthermore, a connector 103 is formed detachably to the transmission/reception module 102, and connects the cable 104 to the transmission/reception module 102. The cable 104 is arranged inside the tube 93 so as to electrically connect the transmission/reception module 102 to the transmission/reception module 112.

The antenna 111 is equipped in the cap 92, and senses a millimeter-wave signal and further radiates a millimeter-wave signal at the other end portion of the handrail 16. As will be discussed later, furthermore, the transmission/reception module 112 receives millimeter-wave signal sensed by the antenna 111, and then, converts this received millimeter-wave signal into an electric signal. After amplifying this converted electric signal, the transmission/reception module 112 supplies the amplified electric signal via the cable 104 to the transmission/reception module 102, and also transmits another electric signal supplied via the cable 104 from the transmission/reception module 102 as a millimeter-wave signal through the antenna 111.

Furthermore, a connector 113 is formed detachably to the transmission/reception module 112, and connects the cable 104 to the transmission/reception module 112.

Electronic Structure of Door/Handrail

Figure 7:
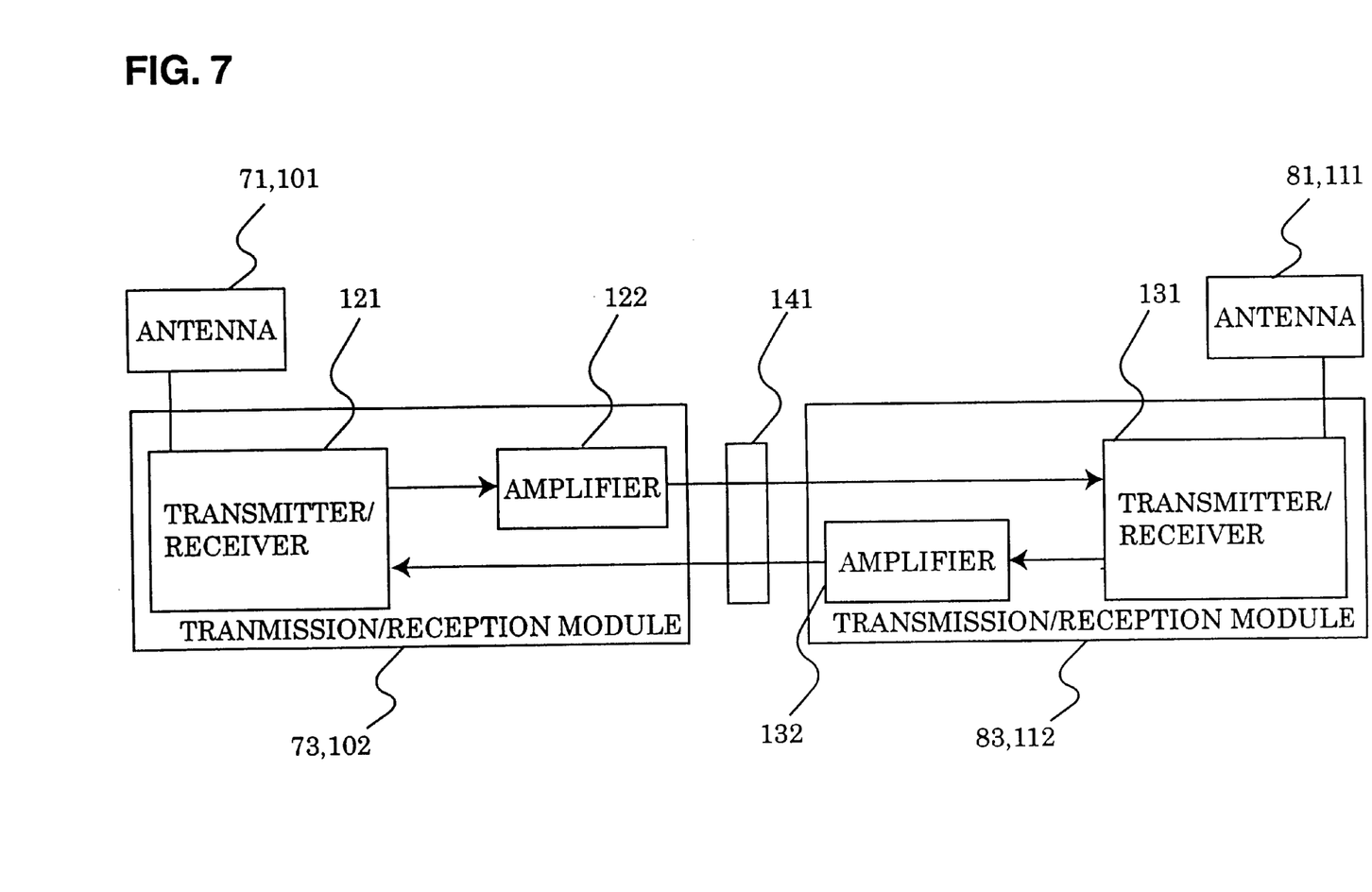
FIG. 7 is a schematic block diagram indicating an electric structure of the door shown in FIG. 3 and of the handrail shown in FIG. 5.

FIG. 7 is a schematic block diagram indicating electric structure employed in the door 14 shown in FIG. 3, and in the handrail 16 shown in FIG. 5. In FIG. 7, a transmitter/receiver 121 constitutes the above-explained transmission/reception modules 73 and 102, and receives millimeter-wave signals sensed by the antennas 71 and 101 to convert these signals into the corresponding electric signals, and also transmits the electric signals supplied from the transmission/reception modules 83 and 112 which are located opposite to the above-described transmission/reception modules 73 and 102 via the antennas 71 and 101 as millimeter-wave signals. In other words, this transmitter/receiver 121 may function as both the receiver (first receiver) for receiving millimeter-wave signals and the transmitter (first transmitter) for transmitting millimeter-wave signals.

Further, in the transmission/reception modules 73 and 102, an amplifier 122 amplifies the electric signals which are converted by the transmitter/receiver 121, and outputs the amplified electric signals to the transmission/reception modules 83 and 112 which are located opposite to the transmission/reception modules 73 and 102.

On the other hand, a transmitter/receiver 131 constitutes the above-explained transmission/reception modules 83 and 112, and receives millimeter-wave signals sensed by the antennas 81 and 111 to convert these signals into the corresponding electric signals, and also transmits the electric signals supplied from the transmission/reception modules 73 and 102 which are located opposite to the above-described transmission/reception modules 83 and 112 via the antennas 81 and 111 as millimeter-wave signals. In other words, this transmitter/receiver 131 may function as both the receiver (first receiver) for receiving millimeter-wave signals and the transmitter (first transmitter) for transmitting millimeter-wave signals.

In addition, in the transmission/reception modules 83 and 112, an amplifier 132 amplifies the electric signals which are converted by the transmitter/receiver 131, and outputs the amplified electric signals to the transmission/reception modules 73 and 102 which are located opposite to these transmission/reception modules 83 and 112.

It should be noted that a transmission means 141 is constituted of either the cables 74/84 and the connector 75 or the cable 104 and the connectors 103/113.

It should also be noted that the transmitter/receiver 31 shown in FIG. 1 is arranged as follows; antennas and transmission/reception modules, which are similar to the antennas 71/101 and the transmission/reception modules 73/102 indicated in FIG. 4 and FIG. 6, are provided on one surface of a wall, whereas antennas and transmission/reception modules, which are similar to the antennas 81/111 and the transmission/reception modules 83/112 shown in FIG. 4 and FIG. 6, are provided on the other surface of this wall. Further, a hole is penetrated through the wall, and then, cables similar to the cables 74/104 are arranged through this hole. An electric structure of this transmitter/receiver 31 is made similar to that employed in the above-explained doorknob or handrail 16.

Instead of that, in the case that millimeter-wave signals can be hardly transmitted due to existence of other obstacles, or in the case that the doorknob capable of transmitting millimeter-wave signals can be hardly provided and/or the handrail 16 can be hardly provided on the stairs, signals transmitted by the millimeter waves may be transferred in a portion of the transmission path by utilizing a home-use electric power line.

In this case, in addition to the two antennas (namely, first antenna and second antenna) and the first receiver, which are installed in the door and the like, a transfer unit (first transfer unit) is installed around an outlet of a home-use power supply furnished in a predetermined floor. This first transfer unit contains an antenna (third antenna) and a receiver (second receiver); the antenna is capable of sensing a millimeter-wave signal, and the receiver receives the millimeter-wave signal sensed via this third antenna, converts the received millimeter-wave signal into an electric signal, and then transmits this converted electric signal via the home-use electric power line. Further, in addition to the first antenna, the second antenna and the first transmitter, which are provided in the door and the like, another transfer unit (second transfer unit) is installed around an outlet of a home-use power supply furnished in another floor which is different from the above-described predetermined floor. This second transfer unit contains an antenna (fourth antenna) and a transmitter (second transmitter); the antenna is capable of transmitting a millimeter-wave signal, and the transmitter receives the electric signal via the home-use electric power line, converts the received electric signal into a millimeter-wave signal, and then transmits this converted millimeter-wave signal via the antenna.

Then, a millimeter-wave signal which is transmitted from the first transmitter installed in the door or on the wall of a predetermined floor is received by the first transfer unit which is provided adjacent to an electric outlet. This first transfer unit converts the received signal into a predetermined high frequency signal, and then applies this high frequency signal to the existing home-use electric power line. Next, the second transfer unit which is provided adjacent to another electric outlet extracts the high frequency signal applied to the home-use electric power line by separating it from the signal at the power supply frequency. Then, the second transfer unit transmits the original millimeter-wave signal by wireless based upon this high frequency signal.

Further, in the case where a signal line for information communication runs along with the existing home-use electric power line, the above-explained high frequency signal may be transferred via this signal line by utilizing the power supply plug, for example, as described in Japanese Design Registration No. 1081583 or No. 1082910, which has been previously proposed by applicant of the present invention. In other words, the power supply plug of the terminal apparatuses 21 and 22 may have a 3-pole female terminal or a 3-pole male terminal used to communicate information via the signal line, and when the plug is inserted to the outlet of the power supply, the 3-pole terminal of the plug is automatically connected to the signal line.

Furthermore, in the above-described door 14 and handrail 16, electric power is supplied to the internal circuits by a power supply unit (not shown). In this case, as the power supply unit, one or plural sets of cells, rechargeable batteries, solar batteries, and the like may be employed. Alternatively, a constant-voltage power supply is employed so as to supply electric power therefrom to the internal circuits. This constant-voltage power supply may produce electric power of a predetermined DC voltage from a home-use power supply. In this case, the constant-voltage power supply may be built in the main body of the door, or the main body of the handrail. Alternatively, while the constant-voltage power supply is installed in an electric outlet, the DC power may be supplied via a cable to the internal circuits.

In addition, while a contact terminal (not shown) is provided at a portion which is made in contact with the door 14 when the door 14 is closed, the electric power may be supplied via this contact terminal and the power supply terminal 56 to the electronic circuit in the doorknob only when this door 14 is closed. Alternatively, while such a mechanical contact between the contact terminal and the power supply terminal 56 is not utilized, the electric power may be supplied in a non-contact manner by utilizing a kind of an coupling phenomenon such as an electromagnetic induction phenomenon. As a result, only when the door 14 is closed, the millimeter-wave signals may be relayed. It should also be noted that even when the door 14 is opened, such millimeter-wave signals may be relayed by providing a battery adjacent to the power supply terminal 56.

Arrangements of Terminal Apparatuses

Figure 8:
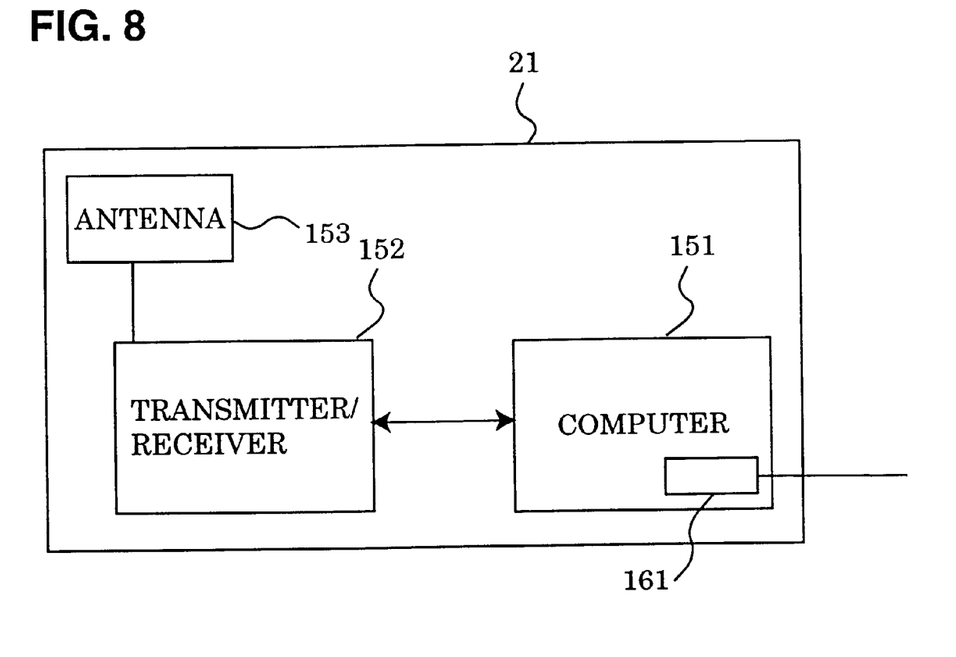
FIG. 8 is a schematic block diagram representing an electric structure of a terminal apparatus shown in FIG. 1.

FIG. 8 is a schematic block diagram indicating a structure of the terminal apparatus 21 shown in FIG. 1. In FIG. 8, a computer 151 corresponds to such a personal computer containing a communication means 161 such as a modem. A transmitter/receiver 152 performs communication with another terminal apparatus 22 in an indirect manner via an antenna 153 by using a millimeter-wave signal.

Figure 9:
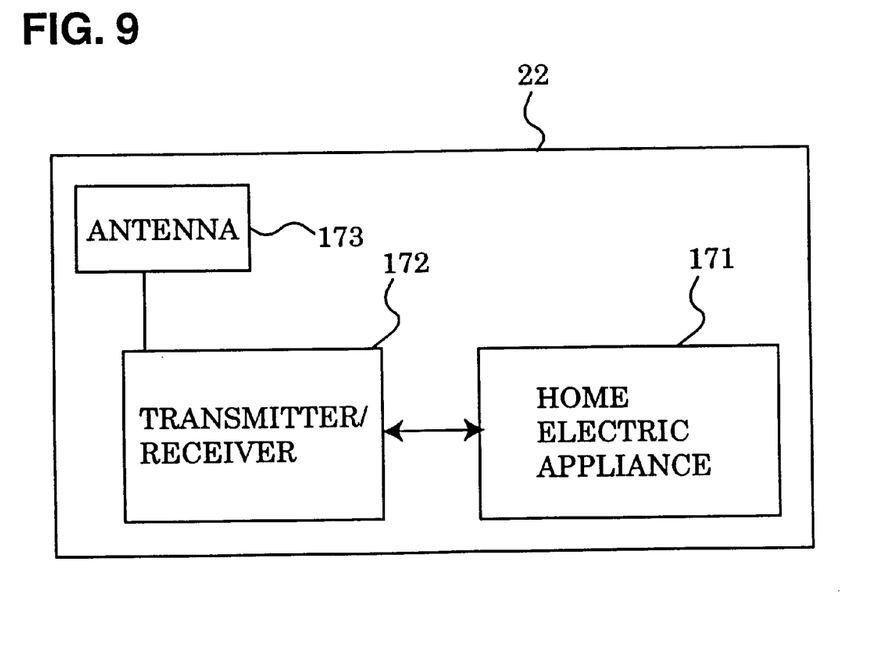
FIG. 9 is a schematic block diagram indicating an electric structure of a terminal apparatus shown in FIG. 1 or FIG. 2.

FIG. 9 is a schematic block diagram representing a structure of the terminal apparatus 22 shown in either FIG. 1 or FIG. 2. In FIG. 9, home electric appliance 171 corresponds to such electric equipment as an image recording apparatus or an air conditioner. Another transmitter/receiver 172 executes communication with either the terminal apparatus 21 or another terminal apparatus 22 having the same structure as the terminal apparatus 21 in an indirect manner via an antenna 173 by using a millimeter-wave signal.

Operations of Various Units

Next, operations of the above-described equipments according to the embodiment of the present invention will be explained.

As an example, the following transmission operation of various sorts of information is described. That is, the terminal apparatus 21 arranged on the first floor transmits various sorts of information to the terminal apparatus 22 arranged on the second floor.

In this case, the computer 151 of the terminal apparatus 21 supplies information to be transmitted to the transmitter/receiver 152. This transmitter/receiver 152 transmits this information via the antenna 153 as a millimeter-wave signal.

Then, this millimeter-wave signal is sensed by one of the antennas, namely the antenna 71 which is provided in the doorknob of the door 14 of the room where the terminal apparatus 21 is installed. This millimeter-wave signal is received via this antenna 71 by the transmitter/receiver 121 of the transmission/reception module 73 and is thereafter converted into an electric signal. The converted electric signal is amplified by the amplifier 122, and thereafter, the amplified electric signal is supplied via the transfer means 141 such as the cable 74 to the transmitter/receiver 131 of the transmission/reception module 83 which is arranged opposite to the transmission/reception module 73.

Then, the transmission/reception module 83 radiates a millimeter-wave signal by wireless corresponding to this supplied electric signal via the other antenna 81.

As a result, even when the door 14 is closed, the millimeter-wave signal may be relayed and reach to the place in the vicinity of the entrance or the lowermost step of the stairs 12.

Next, the millimeter-wave signal which has reached to the place in the vicinity of the lowermost step of the stairs 12 is sensed by the antenna 101 which is set to one end portion of the handrail 16. This millimeter-wave signal is received via this antenna 101 by the transmitter/receiver 121 of the transmission/reception module 102 and is thereafter converted into an electric signal. The converted electric signal is amplified by the amplifier 122, and thereafter, the amplified electric signal is supplied via the transfer means 141 such as the cable 104 to the transmitter/receiver 131 of the transmission/reception module 112 which is arranged opposite to the transmission/reception module 102.

Then, the transmission/reception module 112 radiates a millimeter-wave signal by wireless corresponding to this supplied electric signal via the other antenna 111.

As a result, the millimeter-wave signal may be relayed and reach to a landing located at a center of the stairs 12 shown in FIG. 2. Furthermore, this millimeter-wave signal may be similarly relayed by another handrail 16 to reach to the second floor.

Then, the millimeter-wave signal which has reached to the second floor is sensed by the antenna 71 provided in the door 14 of each of the rooms on the second floor, and is radiated from the antenna 81 provided on the side of the room in a similar manner.

In consequence, even when the door 14 is closed, the millimeter-wave signal reaches to the rooms on the second floor. Then, in the terminal apparatus 22 provided on the second floor, the antenna 173 senses this millimeter-wave signal, the transmitter/receiver 172 receives this millimeter-wave signal to convert it into the electric signal, and then, this electric signal is supplied to the home electric appliance 171.

In this way, the various sorts of information in millimeter-wave signals may be transferred from the terminal apparatus 21 arranged on the first floor to the terminal apparatus 22 arranged on the second floor. In this case, the door 14 on the first floor, the stairs 12, and the door 14 on the second floor are present as obstacles on the signal transmission path. However, in the door 14, the millimeter-wave signal is relayed by the doorknob and also this millimeter-wave signal is relayed by the handrail 16 in the stairs 12. Therefore, the millimeter-wave signal may reach from the terminal apparatus 21 arranged on the first floor to the terminal apparatus 22 arranged on the second floor.

Similarly, the various sorts of information in millimeter-wave signals may be transferred from the terminal apparatus 22 arranged on the second floor to the terminal apparatus 21 arranged on the first floor. Further, the various sorts of information may be transferred between the terminal apparatuses 22 in a similar manner. Moreover, in the case that the building 1 is constructed of only 1 floor, the handrail 16 is not necessarily required. However, in such a case that millimeter-wave signals can hardly reach via, for example, a corridor to another room, the handrail 16 may be installed so as to relay millimeter-wave signals.

Further, since the transmitter/receiver 31, which is installed so as to pass through the wall, relays millimeter-wave signals in a similar manner, millimeter-wave signals emitted from the terminal apparatus 21 on the first floor may reach to the terminal apparatus 22 on the first floor. Alternatively, as shown in FIG. 1, even when the door 15 is replaced by such a door 14 capable of transmitting millimeter-wave signals instead of installing the transmitter/receiver 31, the millimeter-wave signals may reach through two of doors 14 to the terminal apparatus 22 on the first floor.

As explained in detail, the door, the doorknob, the handrail, and the transmission method, according to the embodiment of the present invention are utilized, so that the communication can be carried out within the building by using the signals at millimeter wavelengths.

Further, as a consequence, for instance, the user can control a plurality of home electric appliances 171 such as the image recording apparatus and the air conditioner by merely issuing the instruction via the telephone line to the computer 151 of the terminal apparatus 21 from the outside of the building 1.

In addition, since the fixtures such as the door, the doorknob, and the handrail may be newly installed, or may be employed so as to replace the existing fixtures of the building which has already been constructed, the wireless communication by way of millimeter-wave signals can be realized at low cost even in such an indoor place.

Other Wireless Communication

As previously explained, since the wireless communication can be carried out between the terminal apparatus 21 and the terminal apparatus 22, while MAC (media access control) addresses are assigned to the respective terminal apparatuses 21 and 22, a high-speed wireless LAN (local area network) may be constituted by using millimeter-wave signals.

For example, even in the case that external communication speeds are improved by way of optical fibers or the like in future, high-speed data communication may be carried out between a device in any place of the building and a external device by using this wireless LAN operable with millimeter-wave signals.

At this time, the terminal apparatus 21/22 functioning as a transmission source retrieve the MAC address of the terminal apparatus 21/22 functioning a transmission destination, and then transmit information to this MAC address. Then, when the respective terminal apparatus 21/22 confirms that the transmitted information is addressed to the own MAC address, the terminal apparatus 21/22 receives this information.

Since the respective terminal apparatuses 22, namely the home electric appliances 171 are identified from each other on the wireless LAN based upon the MAC addresses in this manner, for instance, the computer 151 employed in the terminal apparatus 21 may separately establish communication with the respective home electric appliances 171.

It should be also understood that the shapes of both the door and the doorknob are not limited to the above-described shapes, and may be realized by using other shapes. Although the mechanically-designed mechanism of the door is not specifically indicated in these drawings, this door mechanism may be made similar to the normal door mechanism. Further, although the above-explained handrail 16 has a straight-line shape, this shape may be replaced by a curved shape. For instance, in the case that stairs turn, a single piece of such a handrail whose intermediate portion is curved may be installed. Alternatively, while a plurality of handrails 16 are utilized such as shown in FIG. 2, millimeter-wave signals may be relayed by using this modified handrail.

Further, in the above-described embodiments, the antennas 71, 81 and other components are mounted on the knob portions 52 and 61 of the doorknob. Instead of that, the antennas 71 and 81 and other components may be provided on the fixed portions 53 and 62, or the antenna 71 may be provided on one surface of the main body 51 of the door 14, whereas the antenna 81 may be mounted on the other surface of this main body 51 of the door 14.

Furthermore, in the above-explained embodiments, in both the doorknob and the handrail, the transmission/ reception modules are provided at two places. Instead of that, while one transmission/reception module is provided, this transmission/reception module may receive the millimeter-wave signal sensed by one of the two antennas, and properly amplify this received millimeter-wave signal. Then, this amplified millimeter-wave signal may be radiated from the other antenna.

Moreover, in the above-explained embodiments, the antennas 71 and 81 of the doorknob are mounted on the surfaces of the knob portions 52 and 61. Instead of that, the entire of these knob portions 52 and 61 may be employed as the antennas 71 and 81. Further, in the case that the one or more materials of the knob portions 52 and 61 correspond to one or more materials such as plastic in which millimeter-wave signals can pass through, both the antenna 71 and the antenna 81 may be installed on the hollow portions of the knob portions 52 and 61.

In addition, in the above-explained embodiments, the caps 91 and 92 of the handrail 16 are made of plastic, and both the antenna 1 0 1 and the antenna 11 1 are installed inside the caps 91 and 92. Instead of that, while both the caps 91 and 92 may be made of a metal, such antennas 101 and 111, which are electrically insulated, may be provided at either a partial portion or an entire portion of the caps, similar to the above-explained doorknob.

It should also be noted that the room layout of the building 1 is not limited to that shown in FIG. 1 and FIG. 2. Instead of that, since doors are provided in rooms in most cases, in any sorts of room layouts (for example, building with 3 floors or more), signals at millimeter wavelengths can be transmitted indoors by applying the present invention thereto.

As previously described in detail, according to the present invention, it is possible to provide the building, the door, the doorknob, the handrail, and the transmission method, which enable the wireless communication within the building by using millimeter-wave signals.

While the foregoing description and drawings represent the present invention, it will be obvious to those skilled in the art that various changes may be made therein without departing from the true spirit and scope of the present invention.

FIG. 7
71, 101 ANTENNA
73,102 TRANSMISSION/RECEPTION MODULE
121 TRANSMITTER/RECEIVER
122 AMPLIFIER
81,111 ANTENNA
83,112 TRANSMISSION/RECEPTION MODULE
131 TRANSMITTER/RECEIVER
132 AMPLIFIER
FIG. 8
151 COMPUTER
152 TRANSMITTER/RECEIVER
153 ANTENNA
FIG.9
171 HOME-USE ELECTRIC EQUIPMENT
172 TRANSMITTER/RECEIVER
173 ANTENNA

What is claimed is:

1. A building comprising:
   a first antenna mounted on a side of one surface of a door or a wall, for sensing a signal at a millimeter wavelength;
   a second antenna mounted on a side of another surface of said door or said wall, for radiating a signal. at a millimeter wavelength;

a first receiver for receiving the millimeter-wave signal sensed via said first antenna, and for converting the received millimeter-wave signal into an electric signal; and a first transmitter for converting the electric signal which is received and converted by said first receiver into said millimeter-wave signal and for transmitting said converted millimeter-wave signal via said second antenna.

2. A building as claimed in claim 1, further comprising:

a first transfer unit including a third antenna for sensing a signal at a millimeter wavelength, and a second receiver for receiving the millimeter-wave signal sensed by said third antenna to convert said received millimeter-wave signal into an electric signal and for transmitting said converted electric signal via a home-use electric power line, said first transfer unit being installed around an outlet of a home-use power supply on a predetermined floor of a home; and a second transfer unit including a fourth antenna for radiating a signal at a millimeter wavelength, and a second transmitter for receiving said electric signal which is transmitted via said home-use electric power line to convert said received electric signal into said millimeter-wave signal and for transmitting said converted millimeter-wave signal via said fourth antenna, said second transfer unit being installed around an outlet of said home-use power supply on a floor different from said predetermined floor.

3. A building as claimed in claim 1 wherein:

both said first receiver and said first transmitter operate only when said door is closed.

4. A building comprising:

a first antenna provided on one end portion of a handrail which is mounted along stairs or a corridor, for sensing a signal at a millimeter wavelength;

a second antenna provided on another end portion of said handrail, for radiating a signal at a millimeter wavelength;

a receiver for receiving the millimeter-wave signal which is sensed by said first antenna and for converting the received millimeter-wave signal into an electric signal; and a transmitter for converting the electric signal which is converted by said receiver into a millimeter-wave signal, and for transmitting the converted millimeter-wave signal via said second antenna.

5. A door comprising:

a first antenna mounted on any one of one knob portion of a doorknob, a fixing portion for fixing said doorknob on one surface of said door, and one surface of said door, for sensing a signal at a millimeter wavelength;

a second antenna mounted on any one of another knob portion of said doorknob, another fixing portion for fixing the doorknob on another surface of said door, and the other surface of said door, for radiating a signal at a millimeter wavelength;

a receiver for receiving the millimeter-wave signal which is sensed by said first antenna and for converting the received millimeter-wave signal into an electric signal; and a transmitter for converting the electric signal which is received/converted by said receiver into said millimeter-wave signal and for transmitting the converted millimeter-wave signal via said second antenna.

6. A door as claimed in claim 5 wherein:

both said receiver and said transmitter operate only when said door is closed.

7. A doorknob comprising:

a first antenna mounted on one knob portion, for sensing a signal at a millimeter wavelength;

a second antenna mounted on another knob portion, for radiating a signal at a millimeter wavelength;

a receiver for receiving the millimeter-wave signal which is sensed by said first antenna and for converting the received millimeter-wave signal into an electric signal; and a transmitter for converting the electric signal which is converted by said receiver into said millimeter-wave signal and for transmitting the converted millimeter-wave signal via said second antenna.

8. A doorknob as claimed in claim 7 wherein:

both said receiver and said transmitter operate only when the door having the doorknob is closed.

9. A handrail comprising:

a first antenna mounted on one end portion of said handrail, for sensing a signal at a millimeter wavelength;

a second antenna mounted on another end portion of said handrail, for radiating a signal at a millimeter wavelength;

a receiver for receiving the millimeter-wave signal which is sensed by said first antenna and for converting the received millimeter-wave signal into an electric signal; and a transmitter for converting the electric signal which is converted by said receiver into said millimeter-wave signal and for transmitting the converted millimeter-wave signal via said second antenna.

10. A transmission method for transmitting a signal at a millimeter wavelength from a transmission station to a reception station within a building, comprising the steps of:

sensing a signal at a millimeter wavelength by a first antenna on a side of one surface of a door or a wall, which is present on a transmission path defined from said transmission station to said reception station;

receiving said sensed millimeter-wave signal;

converting the received millimeter-wave signal into an electric signal; and transmitting said electric signal via a second antenna as said millimeter-wave signal on a side of another surface of said door or said wall.

11. A transmission method for transmitting a signal at a millimeter wavelength from a transmission station to a reception station within a building, comprising the steps of:

sensing a signal at a millimeter wavelength by a first antenna on a side of one end portion of a handrail mounted along stairs or a corridor which is present on a transmission path defined from said transmission station to said reception station;

receiving said sensed millimeter-wave signal;

converting the received millimeter-wave signal into an electric signal; and transmitting said electric signal via a second antenna as said millimeter-wave signal on a side of the another end portion of said handrail.

* * * * *